UNITED STATES PATENT OFFICE.

AUGUSTUS G. KYLE AND E. E. KYLE, OF NEWVILLE, PENNSYLVANIA.

IMPROVED METHOD OF PRESERVING EGGS.

Specification forming part of Letters Patent No. 55,502, dated June 12, 1866.

*To all whom it may concern:*

Be it known that we, AUGUSTUS G. KYLE and EDWARD E. KYLE, of Newville, Cumberland county, State of Pennsylvania, have invented a new Method of Preserving Eggs; and we do hereby declare that the following is a full, clear, and exact description thereof.

Eggs, like all other substances which are subject to rapid decomposition, can be preserved for a long time in a vacuum in a vessel from which the air is exhausted. But as it is impracticable in many cases to put up eggs in this manner for the market or for home use, we have invented a mode of preserving eggs which is so very simple that it can be adopted by any person acquainted with it.

We take bran, or other substance which will readily absorb moisture and at the same time be suitable as a packing for eggs, and mix with it certain quantities of salt and lime, in the dry state. With this compound we pack away the eggs in a vessel of tin or other suitable substance, arranging the eggs so that they shall not touch each other, and when full the vessel is closed, so as to be as nearly air-tight as possible.

The only object in making the vessel of tin is that its walls shall be impervious to air. The vessel may be made of any other substance which will answer the same purpose.

The proportion of the ingredients which we employ may vary; but we prefer to mix these ingredients together in the following proportions for a barrel of eggs: Bran, two bushels and a half; salt, one bushel; lime, one-half peck.

Bran and salt alone may be used, and will be found to answer a very good purpose if the vessel in which the eggs are packed is perfectly air-tight. The lime is used to preserve the shells of the eggs and to impart a good appearance to them. Instead of the bran sawdust may be used; but we prefer the bran on account of its being more free from dampness than sawdust.

Eggs, when packed away in air-tight vessels in the above-described compound, will preserve their freshness and appearance for a very long time.

Having thus described our invention, what we claim as new, and desire to secure by Letters Patent, is—

The within-described compound as a packing for preserving eggs, substantially as set forth.

AUGUSTUS G. KYLE.
EDWARD E. KYLE.

Witnesses:
WILLIAM LEWIS,
SAMUEL RHOADS.